US012771686B2

(12) United States Patent
Nadiminti et al.

(10) Patent No.: US 12,771,686 B2
(45) Date of Patent: *Oct. 20, 2026

(54) PERMISSIONS FOR BACKUP-RELATED OPERATIONS

(71) Applicant: Hewlett Packard Enterprise Development LP, Spring, TX (US)

(72) Inventors: Syama Sundararao Nadiminti, Bangalore (IN); Annmary Justine Koomthanam, Fort Collins, CO (US); Keshetti Mahesh, Bangalore (IN)

(73) Assignee: Hewlett Packard Enterprise Development LP, Spring, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/795,555

(22) Filed: Aug. 6, 2024

(65) Prior Publication Data

US 2024/0396889 A1 Nov. 28, 2024

Related U.S. Application Data

(63) Continuation of application No. 17/302,010, filed on Apr. 21, 2021, now Pat. No. 12,088,583.

(30) Foreign Application Priority Data

Nov. 11, 2020 (IN) ............................ 202041049345

(51) Int. Cl.
*H04L 9/40* (2022.01)
*G06F 11/1446* (2026.01)
(Continued)

(52) U.S. Cl.
CPC ...... *H04L 63/0853* (2013.01); *G06F 11/1461* (2013.01); *H04L 63/10* (2013.01);
(Continued)

(58) Field of Classification Search
None
See application file for complete search history.

(56) References Cited

U.S. PATENT DOCUMENTS 5,109,413 A 4/1992 Comerford et al.
5,475,834 A 12/1995 Anglin et al.
(Continued)

FOREIGN PATENT DOCUMENTS

CN 101493869 A 7/2009
CN 103248491 A 8/2013
(Continued)

OTHER PUBLICATIONS

Zhao et al "Research and Implementation of Data Storage Backup," IEEE Computer Society, pp. 181-184 (Year: 2018).*
(Continued)

*Primary Examiner* — Luu T Pham
*Assistant Examiner* — James J Wilcox
(74) *Attorney, Agent, or Firm* — Trop, Pruner & Hu, P.C.

(57) ABSTRACT

Example techniques for granting permissions for performing an operation related to a backup copy are described. The backup copy corresponds to first device data and the first device data is stored in a first device. In an example, in response to receiving a request to perform the operation related to the backup copy, telemetry data received from the first device is analyzed. Based on the analysis, it is determined that security of the first device is uncompromised. Based on the determination, a permission to perform the operation related to the backup copy is granted.

15 Claims, 6 Drawing Sheets

(51) Int. Cl.

| | |
|---|---|
| *G06F 9/455* | (2018.01) |
| *G06F 11/34* | (2006.01) |
| *G06F 21/33* | (2013.01) |
| *G06F 21/52* | (2013.01) |
| *G06F 21/55* | (2013.01) |
| *G06F 21/56* | (2013.01) |
| *H04W 12/65* | (2021.01) |

(52) U.S. Cl.

CPC ...... *H04L 63/1416* (2013.01); *G06F 9/45558* (2013.01); *G06F 2009/45587* (2013.01); *G06F 11/1448* (2013.01); *G06F 11/1458* (2013.01); *G06F 11/1464* (2013.01); *G06F 11/3438* (2013.01); *G06F 21/33* (2013.01); *G06F 21/52* (2013.01); *G06F 21/554* (2013.01); *G06F 21/56* (2013.01); *G06F 21/566* (2013.01); *G06F 2201/805* (2013.01); *H04L 63/1408* (2013.01); *H04W 12/65* (2021.01)

(56) References Cited

U.S. PATENT DOCUMENTS 5,613,012 A * 3/1997 Hoffman ................ G06Q 20/12 235/380
5,629,980 A * 5/1997 Stefik ...................... H04L 63/18 705/54
5,634,012 A * 5/1997 Stefik ................. H04N 21/2543 705/39
5,638,443 A * 6/1997 Stefik .................... H04L 63/105 375/E7.009
5,659,614 A 8/1997 Bailey, III
5,764,789 A * 6/1998 Pare, Jr. ................. G06Q 20/10 382/224
5,778,395 A * 7/1998 Whiting .............. G06F 11/1453
5,805,719 A * 9/1998 Pare, Jr. ................... G07C 9/37 382/224
5,813,009 A * 9/1998 Johnson .................. G06F 16/40 707/916
5,838,812 A * 11/1998 Pare, Jr. ................. G06Q 20/10 382/181
5,870,723 A * 2/1999 Pare, Jr. ............... G06Q 20/341 705/39
5,892,900 A * 4/1999 Ginter .................... G06Q 20/12 726/26
5,910,987 A * 6/1999 Ginter ................... H04L 63/083 705/52
5,943,423 A 8/1999 Muftic
6,012,039 A * 1/2000 Hoffman ................ G06Q 20/40 705/76
6,154,852 A * 11/2000 Amundson ......... G06F 11/1456 714/E11.122
6,154,879 A * 11/2000 Pare, Jr. ................. G06Q 20/12 902/4
6,192,142 B1 * 2/2001 Pare, Jr. .................. G06F 18/28 382/116
6,230,148 B1 * 5/2001 Pare, Jr. .............. H04L 63/0823 705/40
6,236,971 B1 * 5/2001 Stefik ................. H04N 21/2543 375/E7.009
6,260,069 B1 7/2001 Anglin
6,269,348 B1 * 7/2001 Pare, Jr. .................. G06F 18/28 705/64
6,453,325 B1 * 9/2002 Cabrera .............. G06F 11/1461
6,564,215 B1 5/2003 Hsiao et al.
6,615,225 B1 9/2003 Cannon et al.
6,678,828 B1 * 1/2004 Pham .................. H04L 67/1097 726/4
6,865,551 B1 * 3/2005 Stefik ................. H04N 21/2541 380/204
7,133,846 B1 * 11/2006 Ginter .............. H04N 21/25875 375/E7.009
7,165,174 B1 * 1/2007 Ginter ................ H04N 7/17309 713/153
7,305,562 B1 * 12/2007 Bianco .................... H04L 63/08 713/184
7,472,422 B1 * 12/2008 Agbabian ............... H04L 41/06 726/25
7,487,395 B2 * 2/2009 van Ingen ........... G06F 11/1456 714/16
7,502,961 B2 * 3/2009 van Ingen ........... G06F 11/0715 714/21
7,574,459 B2 * 8/2009 Sen ..................... G06F 11/1458
7,631,194 B2 * 12/2009 Wahlert .............. G06F 11/1451 713/182
7,702,613 B1 * 4/2010 Dankenbring ...... G06F 11/3684 717/124
7,865,470 B2 * 1/2011 Fries .................. G06F 11/2097 707/821
7,877,781 B2 * 1/2011 Lim ........................ H04L 63/10 726/1
7,882,032 B1 * 2/2011 Hoffman ............... H04W 12/04 705/64
8,099,605 B1 * 1/2012 Billsrom ................. H04L 69/40 726/28
8,255,731 B1 8/2012 Alsina et al.
8,407,345 B2 * 3/2013 Lim ........................ G06F 21/51 709/225
8,407,768 B1 * 3/2013 Hayter ................ H04L 63/0853 726/5
8,467,770 B1 6/2013 Ben Ayed
8,474,032 B2 * 6/2013 Fetik ..................... G06F 21/552 713/151
8,539,567 B1 * 9/2013 Logue ..................... H04L 63/08 709/227
8,595,788 B2 * 11/2013 Lim ........................ H04L 63/20 726/1
8,627,490 B2 * 1/2014 Lim ........................ H04L 63/20 726/1
8,639,625 B1 * 1/2014 Ginter ..................... G06F 21/78 705/50
8,706,800 B1 4/2014 Ahmed et al.
8,732,479 B1 5/2014 Henriksen et al.
8,751,793 B2 * 6/2014 Ginter ................ H04N 21/6581 726/28
9,092,625 B1 * 7/2015 Kashyap ................. G06F 21/52
9,201,887 B1 * 12/2015 Earl .................... G06F 9/45533
9,203,862 B1 * 12/2015 Kashyap .............. G06F 21/552
9,367,697 B1 * 6/2016 Roth ..................... H04L 9/0897
9,374,369 B2 * 6/2016 Mahaffey ............ G06F 21/6245
9,401,905 B1 7/2016 Kowalski et al.
9,438,599 B1 * 9/2016 Yuhan ................... H04L 63/107
9,448,893 B1 * 9/2016 Whitehead ............ G06F 16/273
9,514,324 B1 * 12/2016 Potlapally ........... G06F 21/6218
9,554,274 B1 1/2017 Castinado et al.
9,632,878 B1 * 4/2017 Maccanti ............ G06F 11/1469
9,633,051 B1 * 4/2017 Maccanti ............ G06F 11/1464
9,635,014 B2 4/2017 Venkataraman et al.
9,659,177 B1 5/2017 Juels et al.
9,690,498 B2 6/2017 Hutchison et al.
9,712,326 B2 7/2017 Li
9,712,542 B1 * 7/2017 Brandwine ............. H04L 67/10
9,753,813 B1 9/2017 Fan et al.
9,922,192 B1 * 3/2018 Kashyap ............. G06F 9/45533
9,940,059 B2 * 4/2018 Agrawal ............. G06F 16/2365
10,025,673 B1 * 7/2018 Maccanti ............ G06F 11/1451
10,218,697 B2 * 2/2019 Cockerill ............ H04L 63/0823
10,289,844 B2 5/2019 Charters et al.
10,346,258 B2 7/2019 Sella et al.
10,430,293 B1 10/2019 Skowronski et al.
10,432,618 B1 * 10/2019 Poder .................. H04L 63/0861
10,440,053 B2 * 10/2019 Wyatt ..................... G06F 21/56
10,476,863 B1 * 11/2019 Hanlon ................. H04L 63/108
10,503,904 B1 12/2019 Singh et al.
10,545,834 B1 1/2020 Smith
10,607,027 B1 * 3/2020 Ben Naim .............. G06F 21/64
10,721,141 B1 * 7/2020 Verma ................. H04L 41/0894
10,725,866 B1 * 7/2020 Palaiah ............... G06F 9/45558
10,762,036 B2 9/2020 Gokhale et al.
10,826,900 B1 * 11/2020 Poder .................... H04L 63/105
10,873,601 B1 * 12/2020 Stickle ................ H04L 63/1416
10,931,650 B1 * 2/2021 McCown .............. G06F 21/602

(56) References Cited

U.S. PATENT DOCUMENTS 10,949,382 B2 * 3/2021 Hammer ................ G06F 16/13
11,010,261 B2 * 5/2021 Ashraf ................ G06F 11/1453
11,038,847 B1 * 6/2021 Das ......................... H04L 63/18
11,086,555 B1 8/2021 Botes et al.
11,095,706 B1 * 8/2021 Ankam ................. H04L 63/126
11,171,950 B1 * 11/2021 Zhuravlev ............. H04L 67/141
11,172,361 B2 * 11/2021 Oberheide .............. G06F 21/31
11,467,868 B1 * 10/2022 Voorhees ................ H04L 63/20
11,528,611 B2 12/2022 Smith et al.
11,831,773 B1 11/2023 Sadras et al.
11,914,731 B1 2/2024 Velickovic et al.
2001/0000535 A1 * 4/2001 Lapsley ................. G06Q 40/00 705/40
2001/0010045 A1 7/2001 Stefik et al.
2002/0077986 A1 6/2002 Kobata et al.
2002/0083059 A1 6/2002 Hoffman et al.
2002/0162026 A1 * 10/2002 Neuman ............. H04L 63/0428 726/4
2002/0174139 A1 11/2002 Midgley et al.
2003/0046589 A1 * 3/2003 Gregg ................. H04L 63/0853 726/5
2003/0051039 A1 3/2003 Brown et al.
2003/0051109 A1 3/2003 Cochran
2003/0074378 A1 4/2003 Midgley et al.
2003/0093665 A1 * 5/2003 Cooper ............... H04L 63/0823 705/51
2003/0105725 A1 * 6/2003 Hoffman ................ G06Q 20/40 705/50
2003/0115144 A1 * 6/2003 Stefik ................. G06Q 20/3674 375/E7.009
2003/0115179 A1 6/2003 Prabakaran et al.
2003/0115251 A1 6/2003 Fredrickson et al.
2003/0140003 A1 7/2003 Wang et al.
2003/0172090 A1 * 9/2003 Asunmaa ................ H04L 63/06
2003/0191719 A1 * 10/2003 Ginter .................... G06Q 20/06 375/E7.009
2004/0003269 A1 1/2004 Waxman et al.
2004/0015723 A1 * 1/2004 Pham ...................... H04L 63/10 709/217
2004/0015724 A1 * 1/2004 Pham ...................... H04L 63/12 713/181
2004/0054630 A1 * 3/2004 Ginter .................... H04N 7/162 375/E7.009
2004/0078568 A1 * 4/2004 Pham .................. G06F 21/6218 713/165
2004/0107342 A1 6/2004 Pham et al.
2004/0123129 A1 6/2004 Ginter et al.
2004/0128249 A1 * 7/2004 Hoffman ................. H04L 63/04 705/44
2004/0128378 A1 7/2004 Blakley et al.
2004/0128383 A1 7/2004 Hinton
2004/0128390 A1 7/2004 Blakley et al.
2004/0128546 A1 7/2004 Blakley et al.
2004/0133793 A1 * 7/2004 Ginter ................ H04N 21/4753 375/E7.009
2004/0168061 A1 8/2004 Kostal et al.
2004/0168073 A1 8/2004 Bourne et al.
2004/0168077 A1 8/2004 Waxman et al.
2004/0172558 A1 * 9/2004 Callahan ................ G16H 30/20 709/229
2004/0181303 A1 * 9/2004 Walmsley ............. G06F 21/554 700/121
2004/0250162 A1 12/2004 Halley et al.
2005/0044361 A1 2/2005 Chang et al.
2005/0050226 A1 3/2005 Larson
2005/0060571 A1 3/2005 Wang et al.
2005/0071630 A1 3/2005 Thornton et al.
2005/0086172 A1 * 4/2005 Stefik .................. H04L 12/1403 375/E7.009
2005/0114265 A1 * 5/2005 Satkunanathan ....... G06F 21/10 705/59
2005/0138110 A1 6/2005 Redlich et al.
2005/0144133 A1 * 6/2005 Hoffman ................ G06Q 20/02 705/50
2005/0149450 A1 * 7/2005 Stefik ..................... G06Q 20/12 375/E7.009
2005/0182956 A1 * 8/2005 Ginter ..................... H04L 63/08 375/E7.009
2005/0228836 A1 10/2005 Bacastow et al.
2005/0257265 A1 * 11/2005 Cook .................... G06F 21/566 726/23
2005/0257266 A1 * 11/2005 Cook ........................ G06F 8/61 726/23
2006/0123226 A1 * 6/2006 Kumar ................ H04L 63/0281 713/154
2006/0129627 A1 6/2006 Phillips et al.
2006/0129685 A1 6/2006 Edwards et al.
2006/0143462 A1 * 6/2006 Jacobs .................. H04L 63/126 713/181
2006/0174326 A1 8/2006 Ginter et al.
2006/0190469 A1 * 8/2006 Kathuria ............... G06F 9/4493
2006/0253731 A1 11/2006 Petruzzo
2006/0282681 A1 * 12/2006 Scheidt ................. G06F 21/602 713/186
2007/0011724 A1 * 1/2007 Gonzalez ................ G06F 21/34 713/184
2007/0067349 A1 * 3/2007 Jhaveri ............... G06F 21/6218
2007/0106551 A1 5/2007 McGucken
2007/0136814 A1 6/2007 Lee et al.
2007/0143827 A1 6/2007 Nicodemus et al.
2007/0143851 A1 6/2007 Nicodemus et al.
2007/0156659 A1 * 7/2007 Lim .................... G06F 21/6227
2007/0157288 A1 * 7/2007 Lim ...................... H04L 63/105 726/1
2008/0009265 A1 1/2008 Fernandez-Alonso et al.
2008/0034406 A1 2/2008 Ginter et al.
2008/0046670 A1 2/2008 Lam
2008/0060051 A1 * 3/2008 Lim ....................... G06Q 10/10 726/1
2008/0086735 A1 * 4/2008 Cheenath ................ H04L 67/56 719/313
2008/0104145 A1 5/2008 Lipman et al.
2008/0147821 A1 6/2008 Dietrich et al.
2008/0168135 A1 7/2008 Redlich et al.
2008/0229420 A1 9/2008 Jeschke et al.
2008/0235043 A1 * 9/2008 Goulandris ............. G06F 21/64 726/4
2008/0244732 A1 10/2008 Coninck et al.
2008/0280644 A1 11/2008 Hugot
2008/0289044 A1 11/2008 Choi
2009/0077618 A1 * 3/2009 Pearce ................ H04L 63/0892 726/1
2009/0112878 A1 4/2009 Denny et al.
2009/0228574 A1 9/2009 Maures
2009/0234845 A1 9/2009 Desantis et al.
2009/0310165 A1 12/2009 Olsson et al.
2009/0313503 A1 * 12/2009 Atluri ................. G06F 11/1464 714/E11.023
2009/0328131 A1 12/2009 Chaturvedi et al.
2010/0011178 A1 * 1/2010 Feathergill .......... G06F 11/1466 711/E12.103
2010/0037056 A1 * 2/2010 Follis .................... G06F 21/604 713/168
2010/0037061 A1 2/2010 Stefik et al.
2010/0037296 A1 2/2010 Silverstone
2010/0064341 A1 * 3/2010 Aldera .................. H04W 8/245 726/1
2010/0094981 A1 * 4/2010 Cordray ................ H04L 41/042 709/224
2010/0198730 A1 8/2010 Ahmed et al.
2010/0217974 A1 8/2010 Fujimoto et al.
2010/0235433 A1 * 9/2010 Ansari ................ H04L 63/0876 717/173
2010/0250497 A1 * 9/2010 Redlich .................. G06Q 10/06 707/661
2010/0250955 A1 * 9/2010 Trevithick ............. G06F 21/31 713/185
2010/0269164 A1 10/2010 Sosnosky et al.
2010/0306485 A1 12/2010 Dubhashi et al.

(56) References Cited

U.S. PATENT DOCUMENTS

2010/0318782 A1* 12/2010 Auradkar ............ G06F 11/1451 726/4
2010/0318812 A1* 12/2010 Auradkar .............. H04L 9/0894 713/193
2011/0060916 A1 3/2011 Faitelson et al.
2011/0065419 A1 3/2011 Book et al.
2011/0099620 A1 4/2011 Stavrou et al.
2011/0137946 A1 6/2011 Siress et al.
2011/0145593 A1* 6/2011 Auradkar .............. H04L 9/0833 713/189
2011/0154467 A1 6/2011 Bomar et al.
2011/0246425 A1 10/2011 Ruiz
2011/0258082 A1 10/2011 Schmieder et al.
2011/0258208 A1 10/2011 Plotnik et al.
2011/0276563 A1 11/2011 Sandoval et al.
2011/0283110 A1* 11/2011 Dapkus ................. H04L 9/3234 713/182
2011/0314539 A1 12/2011 Horton
2012/0095926 A1 4/2012 Nishimura et al.
2012/0102088 A1 4/2012 Bindal et al.
2012/0124368 A1* 5/2012 Driessen .................. G09C 5/00 713/153
2012/0198537 A1* 8/2012 Grube ................... G06F 3/0619 726/9
2012/0246472 A1 9/2012 Berengoltz et al.
2012/0260322 A1 10/2012 Logan et al.
2012/0297311 A1* 11/2012 Duggal ................. H04L 67/025 715/740
2012/0297468 A1 11/2012 Bharadwaj Subramanya
2012/0310883 A1 12/2012 Akirav et al.
2012/0310889 A1 12/2012 Mcneil et al.
2012/0310896 A1 12/2012 Freedman et al.
2012/0311280 A1 12/2012 Schmidt et al.
2012/0324242 A1* 12/2012 Kirsch ................. G06Q 20/384 713/189
2013/0006943 A1 1/2013 Chavda et al.
2013/0007845 A1 1/2013 Chang et al.
2013/0007869 A1 1/2013 Thomas
2013/0061035 A1* 3/2013 Hook ...................... G06F 21/62 713/150
2013/0086642 A1* 4/2013 Resch ..................... H04L 9/321 726/4
2013/0086685 A1* 4/2013 Haynes ............... H04L 63/1433 726/25
2013/0124807 A1* 5/2013 Nielsen ............... G06F 11/1482 711/E12.103
2013/0191892 A1* 7/2013 Cadden ..................... H04L 9/32 726/5
2013/0262396 A1* 10/2013 Kripalani .................. G06F 8/61 707/674
2013/0275695 A1 10/2013 Ponsford et al.
2013/0304711 A1* 11/2013 Resch ................. G06F 11/3485 707/690
2013/0312084 A1 11/2013 Sanjay
2013/0318207 A1 11/2013 Dotter
2014/0075568 A1 3/2014 Sathyadevan et al.
2014/0101212 A1 4/2014 Maze
2014/0165138 A1 6/2014 Maida-Smith et al.
2014/0181016 A1* 6/2014 Whitehead .......... G06F 11/2064 707/613
2014/0181027 A1* 6/2014 Whitehead .......... G06F 11/1456 707/639
2014/0181034 A1* 6/2014 Harrison ............. G06F 11/2069 707/646
2014/0181039 A1* 6/2014 Harrison ............... G06F 3/0608 707/652
2014/0181040 A1* 6/2014 Montulli ............. G06F 11/1464 707/652
2014/0181041 A1* 6/2014 Whitehead .......... G06F 11/1446 707/652
2014/0181051 A1* 6/2014 Montulli ............. H04L 67/1097 707/679
2014/0181579 A1* 6/2014 Whitehead .............. G06F 16/21 707/654
2014/0189799 A1* 7/2014 Lu ......................... H04L 63/102 726/4
2014/0201816 A1* 7/2014 Brannon ............... H04L 63/102 726/4
2014/0250511 A1* 9/2014 Kendall .................. G06F 21/44 726/6
2014/0279921 A1 9/2014 Wolfgang
2014/0280952 A1* 9/2014 Shear ...................... H04L 63/10 709/226
2014/0282586 A1* 9/2014 Shear .................... G06F 9/5072 718/104
2014/0282977 A1* 9/2014 Madhu .................... H04L 63/12 726/7
2014/0289516 A1 9/2014 Sahay
2014/0330921 A1* 11/2014 Storm ................ G06F 11/1469 709/213
2014/0331333 A1* 11/2014 Frost .................. H04W 12/128 726/28
2014/0359348 A1* 12/2014 Volvovski ........... G06F 11/3485 709/224
2014/0372752 A1* 12/2014 Sallis .................... H04L 63/126 713/165
2015/0046985 A1 2/2015 D'Souza et al.
2015/0052059 A1 2/2015 Everhart
2015/0058997 A1* 2/2015 Lee ..................... G06F 9/45558 726/26
2015/0074764 A1* 3/2015 Stern ....................... H04L 63/06 726/4
2015/0081635 A1 3/2015 Maze
2015/0082399 A1* 3/2015 Wu ..................... H04L 63/0838 726/10
2015/0089623 A1* 3/2015 Sondhi .................. H04L 63/205 726/9
2015/0132984 A1 5/2015 Kim et al.
2015/0143064 A1* 5/2015 Bhargava ............ G06F 11/1435 711/162
2015/0143082 A1* 5/2015 Smith ................. G06F 11/1482 712/29
2015/0180894 A1 6/2015 Sadovsky et al.
2015/0212906 A1* 7/2015 Gschwind ........... G06F 11/1474 714/15
2015/0222604 A1* 8/2015 Ylonen ..................... H04L 9/14 713/171
2015/0244973 A1 8/2015 Mullen et al.
2015/0271200 A1* 9/2015 Brady ................. H04L 63/1466 726/4
2015/0310188 A1* 10/2015 Ford ..................... H04L 63/101 726/28
2015/0317208 A1 11/2015 Desantis et al.
2015/0363270 A1* 12/2015 Hammer ............... G06F 16/128 711/162
2015/0371053 A1 12/2015 Welch
2015/0371057 A1* 12/2015 Ow ..................... H04L 63/0815 726/28
2016/0028737 A1* 1/2016 Srinivasan .......... H04L 63/0807 726/4
2016/0034305 A1* 2/2016 Shear ........................ G06F 9/50 707/722
2016/0034366 A1 2/2016 Anglin et al.
2016/0055064 A1 2/2016 Gostev
2016/0072800 A1* 3/2016 Soon-Shiong ...... H04L 63/0861 726/7
2016/0094584 A1 3/2016 Mehta et al.
2016/0119379 A1* 4/2016 Nadkarni ............ H04L 63/0263 726/1
2016/0132214 A1* 5/2016 Koushik ................... G06F 8/61 715/741
2016/0134616 A1* 5/2016 Koushik ............. H04L 63/0428 726/9
2016/0142532 A1 5/2016 Bostick et al.
2016/0147607 A1* 5/2016 Dornemann ............ G06F 3/067 711/162
2016/0173499 A1 6/2016 Bianchi et al.
2016/0246995 A1 8/2016 Dictos et al.

(56) References Cited

U.S. PATENT DOCUMENTS

2016/0277368 A1 9/2016 Narayanaswamy et al.
2016/0291940 A1 10/2016 Searle et al.
2016/0291959 A1 10/2016 Searle et al.
2016/0294605 A1 10/2016 Searle et al.
2016/0294614 A1 10/2016 Searle et al.
2016/0301684 A1* 10/2016 He .................... H04L 63/108
2016/0316247 A1 10/2016 Biagini et al.
2016/0342483 A1 11/2016 Klingenberg et al.
2017/0004154 A1* 1/2017 Blumenau ............ G06F 16/219
2017/0004314 A1* 1/2017 Blumenau ............ G06F 11/14
2017/0018130 A1 1/2017 Robinson
2017/0026385 A1 1/2017 Zarkesh et al.
2017/0041296 A1* 2/2017 Ford .................... G06F 21/64
2017/0083406 A1 3/2017 Qi et al.
2017/0099293 A1* 4/2017 Tan .................... H04L 67/535
2017/0118202 A1* 4/2017 Mathew ............... G06F 21/445
2017/0132086 A1 5/2017 Blackburn et al.
2017/0168903 A1* 6/2017 Dornemann ........ G06F 11/2038
2017/0185488 A1* 6/2017 Kumarasamy ...... G06F 11/2038
2017/0220404 A1* 8/2017 Polar Seminario ........................ G06F 11/0751
2017/0220425 A1 8/2017 Anders
2017/0235490 A1* 8/2017 Tan ..................... G06F 21/10 711/152
2017/0264634 A1* 9/2017 Carter ................. H04L 63/102
2017/0333779 A1 11/2017 El Labban
2017/0337354 A1* 11/2017 Drey .................. G06Q 50/184
2017/0346851 A1* 11/2017 Drake ................. H04L 9/0838
2017/0353500 A1 12/2017 Jacobsen et al.
2018/0011768 A1* 1/2018 Bradbury .............. G06F 9/467
2018/0026984 A1 1/2018 Maker et al.
2018/0033226 A1* 2/2018 Robertson .......... H04L 63/0876
2018/0034639 A1* 2/2018 Resch .................. H04L 9/321
2018/0034835 A1 2/2018 Iwanir et al.
2018/0095855 A1* 4/2018 Sanakkayala ....... G06F 11/3006
2018/0103036 A1* 4/2018 Fox ..................... H04L 63/304
2018/0129666 A1 5/2018 Havewala et al.
2018/0145969 A1 5/2018 Agrawal et al.
2018/0145970 A1 5/2018 Agrawal et al.
2018/0191695 A1* 7/2018 Lindemann ......... H04L 63/0853
2018/0196960 A1* 7/2018 Gullicksen .......... H04L 63/107
2018/0211038 A1* 7/2018 Breiman ............. G06F 11/1451
2018/0225177 A1 8/2018 Bhagi et al.
2018/0227315 A1* 8/2018 Taneja ............... H04L 63/1408
2018/0270290 A1* 9/2018 Sinha ................. H04L 67/2871
2018/0285205 A1 10/2018 Mehta et al.
2018/0285207 A1 10/2018 Mehta et al.
2018/0285353 A1* 10/2018 Ramohalli Gopala Rao .............. G06F 16/214
2018/0300205 A1 10/2018 Sehgal et al.
2018/0314603 A1* 11/2018 Gibbons, Jr. ....... H04L 67/1097
2018/0322260 A1 11/2018 Adam
2018/0336554 A1* 11/2018 Trotter ............... H04L 63/0853
2018/0341666 A1 11/2018 Lee et al.
2018/0349581 A1* 12/2018 Ramalingam ......... H04L 63/205
2018/0351969 A1 12/2018 Macleod et al.
2018/0359259 A1* 12/2018 Leon ..................... G06F 9/445
2018/0373877 A1 12/2018 Bruso et al.
2019/0007212 A1* 1/2019 Neve de Mevergnies .................. H04L 9/3226
2019/0068622 A1 2/2019 Lin et al.
2019/0095101 A1* 3/2019 Leggette ............... G06F 3/0604
2019/0098014 A1* 3/2019 Harrison ............... H04L 63/083
2019/0116153 A1* 4/2019 Deverakonda Venkata ................ H04L 9/3268
2019/0196981 A1 6/2019 Silvert
2019/0200844 A1* 7/2019 Shelton, IV .......... H04L 63/123
2019/0201136 A1* 7/2019 Shelton, IV ............ H04L 67/10
2019/0206562 A1* 7/2019 Shelton, IV ............ H04L 67/10
2019/0206564 A1* 7/2019 Shelton, IV ............ A61M 1/79
2019/0207929 A1 7/2019 Koorapati et al.
2019/0228178 A1* 7/2019 Sharma ............... H04L 63/0853
2019/0230092 A1 7/2019 Patel et al.
2019/0238525 A1* 8/2019 Padmanabhan ....... H04L 63/101
2019/0243953 A1 8/2019 Fargo et al.
2019/0253453 A1* 8/2019 Vissamsetty ............ H04L 63/10
2019/0258782 A1* 8/2019 Lerner .................. G07C 9/257
2019/0266052 A1* 8/2019 Lamba ................ G06F 11/1092
2019/0273733 A1* 9/2019 Kawabata ............. H04L 63/104
2019/0294505 A1 9/2019 Hempelmann et al.
2019/0327082 A1* 10/2019 Ow ....................... G06N 5/022
2020/0007311 A1 1/2020 Oberhofer et al.
2020/0026732 A1* 1/2020 Bequet .................. G06F 16/164
2020/0028681 A1 1/2020 Chen et al.
2020/0036708 A1* 1/2020 Mars ..................... H04L 63/107
2020/0036709 A1* 1/2020 Mars ................... H04L 63/0853
2020/0036789 A1* 1/2020 Mehta ..................... G06F 16/27
2020/0053111 A1* 2/2020 Jakobsson ........... H04L 63/1416
2020/0057697 A1* 2/2020 Yeung ................. G06F 11/1466
2020/0067861 A1* 2/2020 Leddy ................. G06F 21/6245
2020/0097177 A1* 3/2020 Ashokkumar .......... G06F 3/065
2020/0099682 A1* 3/2020 Alexander ............ H04L 63/105
2020/0111091 A1* 4/2020 Ellingson ........... G06Q 20/3829
2020/0117549 A1 4/2020 Bansal et al.
2020/0128024 A1 4/2020 Kuramkote et al.
2020/0134229 A1* 4/2020 Ranger ................... G06F 16/13
2020/0175184 A1 6/2020 Ved
2020/0186520 A1* 6/2020 Oberheide ........... G06Q 20/356
2020/0193064 A1* 6/2020 Liu .......................... H04L 9/50
2020/0228343 A1 7/2020 Yu et al.
2020/0241967 A1* 7/2020 Dain .................. G06F 11/0793
2020/0250295 A1* 8/2020 Padmanabhan ....... H04L 63/102
2020/0250667 A1* 8/2020 Ow .................... G06Q 20/3829
2020/0252404 A1* 8/2020 Padmanabhan ....... H04L 63/061
2020/0252406 A1* 8/2020 Padmanabhan ....... H04L 9/3271
2020/0259667 A1 8/2020 Garnier et al.
2020/0319799 A1 10/2020 Mayer et al.
2020/0320215 A1 10/2020 Bhosale et al.
2020/0327017 A1 10/2020 Mjayan et al.
2020/0344235 A1 10/2020 Bhuiyan et al.
2020/0344237 A1 10/2020 Murdoch et al.
2020/0351271 A1 11/2020 Murdoch et al.
2020/0351347 A1 11/2020 Chang et al.
2020/0356450 A1 11/2020 Littlefield et al.
2020/0364354 A1* 11/2020 Schwartz .............. H04L 9/3268
2020/0374106 A1* 11/2020 Padmanabhan ..... H04L 63/0428
2020/0379781 A1* 12/2020 Rachapudi ................ G06F 8/30
2020/0382557 A1 12/2020 Woolward et al.
2020/0401489 A1 12/2020 Mitkar et al.
2020/0403996 A1 12/2020 Parimi et al.
2020/0404016 A1* 12/2020 Pike .................... H04L 63/1441
2020/0409795 A1 12/2020 Lim et al.
2020/0412768 A1* 12/2020 Hegde ..................... H04L 63/10
2021/0014243 A1 1/2021 Kulaga et al.
2021/0027265 A1 1/2021 Hasek, IV
2021/0042199 A1 2/2021 Migga-Vierke et al.
2021/0058395 A1* 2/2021 Jakobsson ............. H04L 67/306
2021/0067638 A1 3/2021 Liu
2021/0092135 A1* 3/2021 Strogov .............. H04L 63/1416
2021/0157680 A1* 5/2021 LeCrone ............. G06F 11/1464
2021/0165720 A1 6/2021 Bode
2021/0216478 A1* 7/2021 Miller ..................... G06F 21/79
2021/0232465 A1* 7/2021 Neier .................. G06F 11/1461
2021/0240572 A1 8/2021 Upadhyay et al.
2021/0240573 A1 8/2021 Upadhyay et al.
2021/0240574 A1 8/2021 Upadhyay et al.
2021/0243193 A1* 8/2021 Padmanabhan ....... G06F 16/252
2021/0255771 A1* 8/2021 Kilaru ................... G06F 3/0659
2021/0271564 A1* 9/2021 Mitkar ................ G06F 11/1461
2021/0271565 A1* 9/2021 Bhavanarushi ..... G06F 9/45558
2021/0286639 A1* 9/2021 Kumar .................. G06F 3/0604
2021/0286684 A1* 9/2021 Nara ................... G06F 11/1464
2021/0303411 A1 9/2021 Kvache et al.
2021/0303416 A1 9/2021 Brenner et al.
2021/0318935 A1* 10/2021 Jacobs ................ G06F 11/1469
2021/0326218 A1* 10/2021 Rachapudi .......... G06F 11/3006
2021/0406129 A1* 12/2021 Zheng ................. G06F 16/1756
2021/0409227 A1 12/2021 Ponnuswamy et al.
2022/0043717 A1 2/2022 Yadav et al.
2022/0124084 A1* 4/2022 Maylor ................. H04L 63/205

(56) References Cited

U.S. PATENT DOCUMENTS

| | | | | |
|---|---|---|---|---|
| 2022/0141215 | A1* | 5/2022 | Kwok | H04L 63/0853 726/6 |
| 2022/0150241 | A1 | 5/2022 | Nadiminti et al. | |
| 2022/0277068 | A1 | 9/2022 | Miyazaki et al. | |

FOREIGN PATENT DOCUMENTS

| | | | |
|---|---|---|---|
| CN | 109906433 | A | 6/2019 |
| CN | 110392876 | A | 10/2019 |
| CN | 111095250 | A | 5/2020 |
| CN | 119621236 | B | 9/2025 |
| DE | 102020101084 | A1 | 8/2020 |
| WO | 2015/162276 | A2 | 10/2015 |

OTHER PUBLICATIONS

Bae et al "A Secure Secondary Backup Storage with an Isolated Authentication," IEEE, pp. 122-125 (Year: 2012).*

Kaur et al "Secure VM Backup and Vulnerability Removal in Infrastructure Clouds," 2014, IEEE, pp. 1216-1226 (Year: 2014).*

Shaukat et al "RansomWall: A Layered Defense System Against Cryptographic Ransomware Attacks Using Machine Learning," IEEE, pp. 356-363 (Year: 2018).*

Min et al "A Content-Based Ransomware Detection and Backup Solid-State Drive for Ransomware Defense," IEEE, pp. 2038-2051 (Year: 2022).*

Bae et al "A Secure Secondary Backup Storage with an Isolated Authentication," 2012 Sixth International Conference on Innovative Mobile and Internet Services in Ubiquitous Computing, IEEE, pp. 122-125 (Year: 2012).

EzmeralExperts; "Expand backups to secondary storage: HPE SimpliVity hyperconverged infrastructure and HPE StoreOnce", May 26, 2020, 3 pages, retrieved from https://community.hpe.com/15/Around-the-Storage-Block/Expand-backups-to-secondard-storage-HPE-SimpliVity/ba-p/7088771.

Hewlett Packard Enterprise, "HPE InfoSight: Artificial Intelligence for autonomous infrastructure", Feb. 2020, 6 pages.

Kaur et al "Secure VM Backup and Vulnerability Removal in Infrastructure Clouds," IEEE, pp. 1217-1226, (Year: 2014.

Microsoft Docs; "Overview of security features in Azure Backup"; Mar. 12, 2020; 5 pages.

Nguyen et al "Log Safe: Secure and Scalable Data Logger for IoT devices," 2018 IEEE/ACM Third International Conference on Internet-of-Things Design and Implementation, IEEE Computer Society, pp. 141-152 (Year: 2018).

Ottaviani et al "Shared Backup and Restore," IEEE, pp. 1-5 (Year: 2011).

Veeam, "Ransomware: A modern threat to modern data", Sep. 4, 2020, 9 pages.

Zhao et al "Research and Implementation of Data Storage Backup," 2018 IEEE International Conference on Energy Internet, IEEE Computer Society, pp. 181-184 (Year: 2018).

* cited by examiner

PERMISSIONS FOR BACKUP-RELATED OPERATIONS

CROSS REFERENCE TO RELATED APPLICATIONS

This application is a continuation of U.S. patent application Ser. No. 17/302,010, filed on Apr. 21, 2021, which claims priority to Indian patent application No. 202041049345 filed Nov. 11, 2020. The disclosure of the aforementioned application is hereby incorporated by reference in its entirety.

BACKGROUND

Data stored in a computing device may become unusable due to various reasons, such as due to deletion of corruption of the data. To prevent the loss of the data altogether due to the non-usability, a backup copy of the data may be utilized to restore the data in the computing device. The backup copy may be stored remotely from the computing device, such as on a cloud storage device.

BRIEF DESCRIPTION OF DRAWINGS

The following detailed description references the figures, wherein.

DETAILED DESCRIPTION

Figure 1:
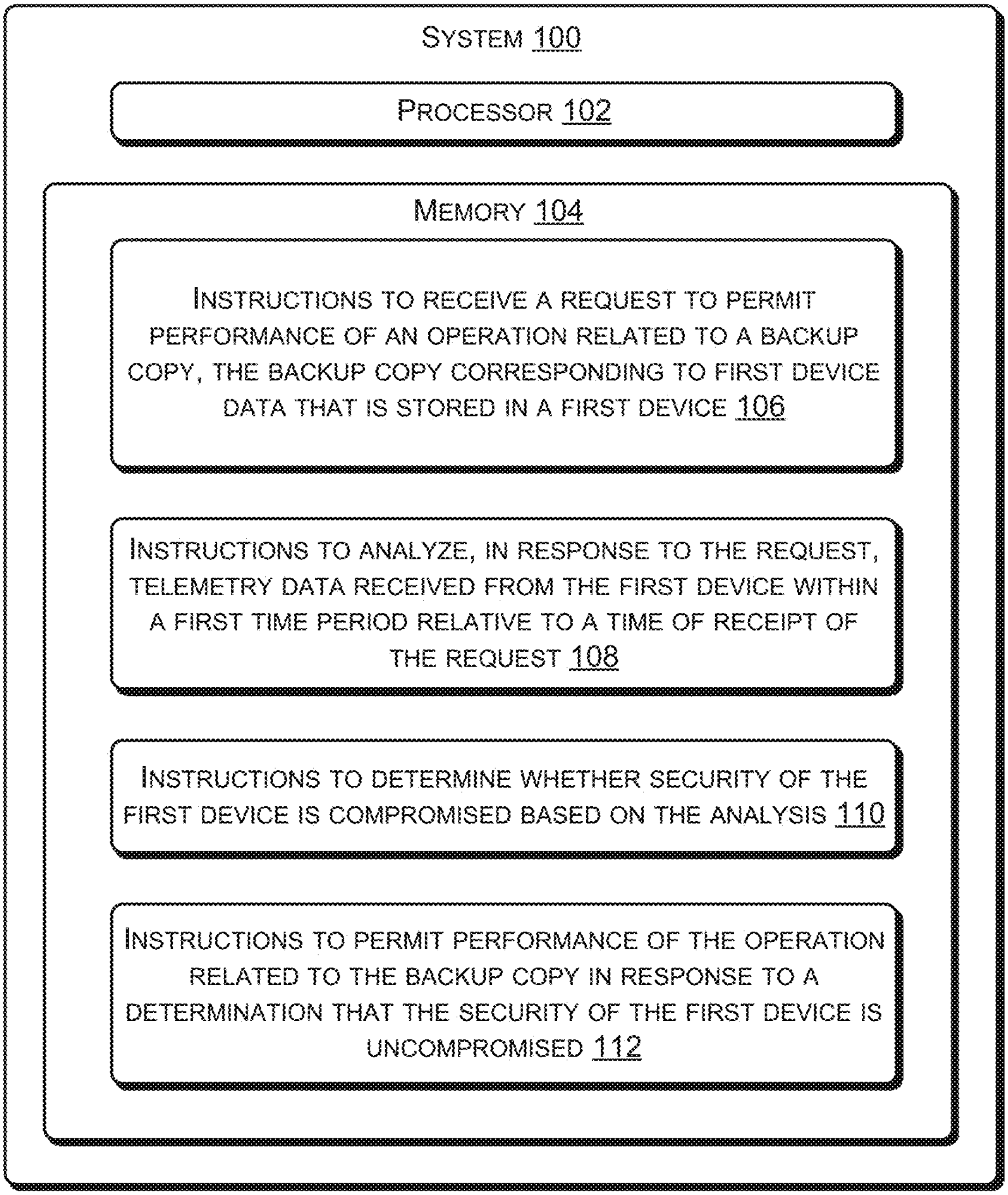
FIG. 1 illustrates a system for permitting performance of backup-related operations, according to an example implementation of the present subject matter.

Data stored in a computing device may be rendered unusable, for example, due to the presence of malware in the computing device. For example, ransomware, a type of malware, encrypts files in the computing device, thereby preventing a user from using the files. A key for decrypting the files may be provided to the user upon payment of a ransom amount.

A backup copy of the data may be utilized to restore the data if the data becomes unusable. However, in some cases, the backup copy may also become unusable. This may be, for example, if the malware propagates to the backup copy during execution of backup operations and renders the backup copy unusable, such as by modifying or deleting the backup copy.

The present subject matter relates to permissions for backup-related operations. With the implementations of the present subject matter, backup copies can be prevented from becoming unusable due to malware attacks.

In accordance with an example implementation, a request may be received to permit performance of an operation related to a backup copy. An operation related to a backup copy may also be referred to as a backup-related operation and may include, for example, creation, modification, or deletion of the backup copy. The backup copy may correspond to first device data that is stored in a first device. Further, the backup copy may be stored in a second device. In an example, the first device data may be related to a virtual machine (VM) hosted on the first device and the backup copy may be a VM image from which the VM can be restored.

In response to receiving the request, telemetry data received from the first device is analyzed. The telemetry data may include information of operations performed on the first device. For instance, the telemetry data may include information of login attempts made, number of file encryptions, number of file deletions, workload parameters of hardware components of the first device (hardware components may be, for example, processor, memory, and storage), or any combination of the foregoing. In an example, telemetry data received within a particular time period relative to a time of receipt of the request is analyzed. For instance, telemetry data received within a first time period before the time of receipt of the request, telemetry data received within a second time period after the time of receipt of the request, or both are analyzed. In an example, the analysis of the telemetry data may be performed by a system that periodically receives the telemetry data from the first device to identify or predict the occurrence of a fault in the first device.

Based on the analysis, it is determined whether security of the first device is compromised. The security of the first device may be determined to be compromised, for example, if a number of login attempts in a particular time period is greater than an average number of login attempts. If it is determined that the security of the first device has not been compromised, the backup-related operation is permitted to be performed. To permit the performance, in an example, a token granting permission may be transmitted to the first device, which may send the token to the second device. Based on the token, the second device may perform the backup-related operation. If the security of the first device is determined to be compromised, the request to perform the backup-related operation is denied.

In an example, to determine whether security of the first device has not been compromised, in addition to analysis of the telemetry data, a secure handshake-based verification may also be utilized. To perform the secure handshake-based verification, the system that analyzes the telemetry data may also attempt to establish a secure handshake with the first device. In response to establishment of the secure handshake, the system may determine that security of the first device is uncompromised.

The present subject matter may prevent loss or non-usability of a backup copy due to malware attacks on a computing device storing parent data, i.e., the data to which the backup copy corresponds. Thus, the backup copies may be made immune to malware attacks on the computing devices storing the parent data. The present subject matter utilizes telemetry data of a computing device sending a request for the backup-related operation to determine whether security of the computing device is compromised. Thus, the present subject matter may provide a simpler and a more efficient determination regarding the security of the computing device. Further, the present subject matter may leverage the telemetry data that is already received from the computing device for identification and prediction of faults. Thus, little or no additional data may have to be provided by the computing device to implement the present subject matter.

The following description refers to the accompanying drawings. Wherever possible, the same reference numbers are used in the drawings and the following description to refer to the same or similar parts. While several examples are described in the description, modifications, adaptations, and other implementations are possible and are intended to be covered herein.

FIG. 1 illustrates a system 100 for permitting performance of operations related to backup copies, according to an example implementation of the present subject matter. The system 100 may be implemented as a computing device, such as a desktop computer, a laptop computer, a server, or the like. The system 100 includes a processor 102 and a memory 104 coupled to the processor 102.

The processor 102 may be implemented as a microprocessor, a microcomputer, a microcontroller, a digital signal processor, a central processing unit, a state machine, a logic circuitry, and/or any device that can manipulate signals based on operational instructions. Among other capabilities, the processor 102 may fetch and execute computer-readable instructions included in the memory 104. The computer-readable instructions may include instructions 106-112. The functions of the processor 102 may be provided through the use of dedicated hardware as well as hardware capable of executing machine-readable instructions.

The memory 104 may include any non-transitory computer-readable medium including volatile memory (e.g., RAM), and/or non-volatile memory (e.g., EPROM, flash memory, Memristor, etc.). The memory 104 may also be an external memory unit, such as a flash drive, a compact disk drive, an external hard disk drive, or the like.

In addition to the processor 102 and the memory 104, the system 100 may also include interface(s) and system data (not shown in FIG. 1). The interface(s) may include a variety of instructions-based interfaces and hardware interfaces that allow interaction with a user and with other communication and computing devices, such as network entities, web servers, and external repositories, and peripheral devices. The system data may serve as a repository for storing data that may be fetched, processed, received, or created by the instructions.

In operation, the instructions 106 are executable to receive a request to permit performance of an operation related to a backup copy. An operation related to a backup copy may also be referred to as a backup-related operation, and may be, for example, a backup creation operation, a backup modification operation, or a backup deletion operation. The request may also be referred to as a permission request. The backup copy may correspond to first device data that is stored in a first device (not shown in FIG. 1). For example, the backup copy may be an exact copy of the first device data. The backup copy may be stored in a second device (not shown in FIG. 1). In an example, the first device data and the backup copy may include data corresponding to the first device. Further, the backup copy may be an image from which the first device can be restored to its operational state. For instance, the first device data and the backup copy may include data corresponding to a Virtual Machine (VM) that is hosted on the first device. The data corresponding to the VM may include, for example, files, folders, applications, and operating system (OS) of the VM. Accordingly, the backup copy may be a VM image from which the VM can be instantiated. The permission request may be sent to the system 100 by the first device.

In response to the request, telemetry data received from the first device is analyzed. In an example, the telemetry data may indicate the operations performed on the first device, workload information of hardware components of the first device, read count of data of the first device, write count of data of the first device, a number of failed attempts to perform a backup-related operation, a backup policy, or a combination thereof. The data may include, for example, the first device data. The operations performed on the first device may be, for example, a number of login attempts, a number of file encryptions, a number of file modifications, a number of file deletions, or a combination thereof. The workload information of the hardware components may include, for example, workload of a processor of the first device, workload of a memory of the first device, Input/Output operations per second (IOPS) of a storage of the first device, or a combination thereof. The read count of the data and the write count of data denotes the number of times the data is read from and written to respectively. The number of failed attempts to perform a backup-related operation help to track previously identified backup issues. An attempt to perform a backup-related operation may have failed, for example, if the security of the first device was determined to have been compromised, as will be explained later. A backup policy of the first device may indicate a frequency of backup creation operation (i.e., how often a backup copy is to be created), a backup retention period (i.e., for how long a backup copy is to be retained), and a backup target (i.e., where a backup copy is to be stored). In an example, instead of the backup policy, the telemetry data may include an identifier of the backup policy. Further, the system 100 may have stored therein the backup policy and the identifier. Accordingly, upon receiving the identifier as part of the telemetry data, the system 100 may retrieve and analyze the backup policy.

In an example, the system 100 may analyze telemetry data that is received within a first time period (also referred to as a "first period"). The first time period may be defined relative to a time when the request is received. For instance, the system 100 may analyze telemetry data that is received within a first period before receipt of the request. Instead of, or in addition to, analyzing the telemetry data received in the first time period before the receipt of the request, the system 100 may analyze telemetry data that is received in a second time period after receipt of the request. The analysis of the telemetry data may be performed when the instructions 108 are executed.

Based on the analysis, it is determined if a security of the first device is compromised. The security of the first device may be compromised, for example, due to a malware attack. The determination regarding the security of the first device is performed when the instructions 110 are executed. If it is determined that the security of the first device is uncompromised, a permission is provided for performing the backup-related operation. To provide the permission, the system 100 may transmit a token indicating the permission to the first device. The permission may be provided when the instructions 112 are executed.

Figure 2:
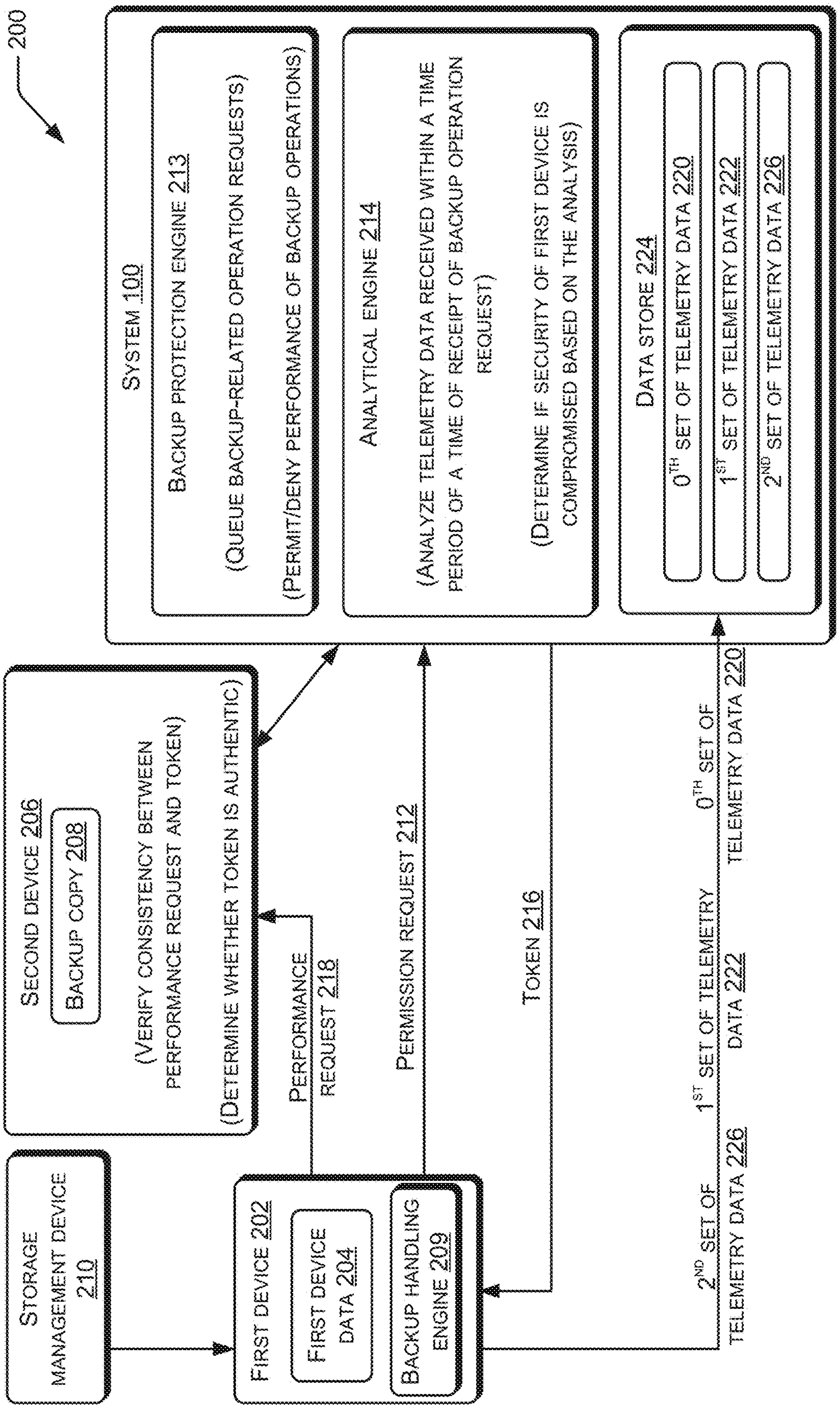
FIG. 2 illustrates a network environment implementing a system to permit performance of backup-related operations, according to an example implementation of the present subject matter.

FIG. 2 illustrates a network environment 200 implementing the system 100 to permit performance of backup-related operations, according to an example implementation of the present subject matter. The network environment 200 includes a first device 202. In an example, the first device 202 may be a server computer. In another example, the first device 202 may be a hyperconverged infrastructure device, in which compute, storage, and networking are integrated. The first device 202 may be provided in a data center or in a remote site, such as an offshore drilling rig. The first device 202 may have a first device data 204 stored therein. The first device data 204 may include files, folders, or the like. In an example, the first device data 204 may be data corresponding to a VM (not shown in FIG. 2) hosted in the first device 202. In another example, the first device data 204 may be data corresponding to the first device 202.

The network environment 200 also includes a second device 206 that is to store backup copies of parent data stored in other devices. For example, the second device 206 may store a backup copy 208 that corresponds to the first device data 204. The backup copy 208 may include a copy, a replica, an image, or the like of the first device data 204. In an example, the backup copy 208 may be an image of the VM hosted in the first device 202 and from which the VM can be restored or may be an image from which the first device 202 can be restored. The second device 206 may include a storage (not shown in FIG. 2), such as a hard disk or a solid-state disk (SSD) for storing the backup copies. In an example, the first device 202 may be an edge device and the second device 206 may be a core device corresponding to the edge device. A core device corresponding to an edge device may refer to a device that may receive data from the edge device for further processing, that may instruct the edge device to perform a computing task, or both. The core device may have more storage capability as compared to the edge device, and can therefore store backup copies from the edge device.

The first device data 204 may be restored in the first device 202 from the backup copy 208 when the first device data 204 becomes unusable. The non-usability of the first device data 204 may be, for example, due to corruption of a storage (not shown in FIG. 2) of the first device 202, inadvertent deletion, or the like. The non-usability may also be due to a compromise in the security of the first device 202. For example, the first device 202 may be infected by a ransomware, which may cause encryption of data in the first device 202. In some cases, the security compromise of the first device 202 may affect the backup copy 208 as well. For instance, the ransomware that has infected the first device 202 may cause deletion of the backup copy 208. The ransomware may also cause modification of the backup copy 208, such as by causing deletion of parts of the backup copy 208, encryption of the backup copy 208, or modification of metadata of the backup copy 208, such that the first device data 204 cannot be restored from the backup copy 208. The ransomware may also cause creation of an encrypted backup copy in the second device 206 by instructing the second device 206 to store the encrypted backup copy. The key for the encryption may be known to the creators of the ransomware and not to a user of the first device 202. Thus, the encryption renders that backup copy non-usable. The ransomware may also cause creation of a new backup copy that replaces (and thus deletes) an uncorrupted backup copy, such as the backup copy 208.

To help prevent deletion, modification, or replacement of the backup copy 208 due to a compromise in the security of the first device 202, in an example, the first device 202 includes a backup handling engine 209. In an example, the backup handling engine 209 may be implemented by a processor of the first device 202 by executing a set of instructions (not shown in FIG. 2). The backup handling engine 209 receives a request to perform a backup-related operation. The backup handling engine 209 may receive the request related to the backup-related operation, for example, from a user of the first device 202 or a storage management device 210 that administers storage of backup copies corresponding to data in the first device 202. In case of the latter, the storage management device 210 may send the request based on, for example, a backup policy or an instruction from a storage administrator. In an example, in case of a malware attack on the first device 202, the request to the backup handling engine 209 may be sent by the malware.

In an example, the request may specify a backup-related operation to be performed. The request may also specify the name of the device data or of the backup copy corresponding to the backup-related operation. For instance, the request may specify that a new backup copy of the first device data 204 is to be created or that the backup copy 208 is to be deleted. Upon receiving the request, the backup handling engine 209 sends a permission request 212 to the system 100 to permit performance of the backup-related operation. In an example, the permission request 212 may specify the backup-related operation to be performed and may specify the name of the device data or of the backup copy, i.e., the first device data 204 or the backup copy 208 respectively, or both corresponding to the backup-related operation. By sending a permission request to the system 100 in response to each request received, the backup handling engine 209 may prevent execution of a malicious request that is generated by a malware. In another example, the permission request 212 may be sent by the second device 206. The second device 206 may send the permission request 212 in response to receiving a request to perform a backup-related operation from the backup handling engine 209. The permission request 212 may be referred to as corresponding to the first device 202, as the first device 202 stores the parent data of the backup copy to which the permission request 212 corresponds.

Upon receiving the permission request 212, the system 100 may determine whether security of the first device 202 (the device corresponding to the permission request 212) is compromised. The determination as to whether the security of the first device 202 is compromised may also be referred to as verifying the security of the first device 202.

The system 100 includes a backup protection engine 213 that receives permission requests, such as the permission request 212, from computing devices, such as the first device 202, and queues the permission requests. Further, the backup protection engine 213 causes an analytical engine 214 to verify the security of a device corresponding to each queued permission request. In an example, the backup protection engine 213 and the analytical engine 214 may each be implemented by the processor 102 by executing a set of instructions (not shown in FIG. 2).

To verify the security of the first device 202, the analytical engine 214 may utilize telemetry data sent by the first device 202. The information included in the telemetry data can be used to verify whether the first device 202 is under a malware attack. For example, the number of login attempts, which may be part of the telemetry data, may indicate the number of successful and unsuccessful attempts to login to the first device 202 in a period of time. A high number of unsuccessful login attempts in a short period of time may suggest an unauthorized attempt to intrude into the first device 202. A high number of file encryptions within a short period of time may indicate ransomware activity in the first device 202. Similarly, a large number of file modifications or file deletions, a high workload of the hardware components, a large read count or a write count of data, or a large number of failed attempts to perform a backup-related operation may indicate ransomware activity. Further, a new backup policy, which may be part of the telemetry data, that indicates a reduced backup retention period or an increased frequency of backup creation may also indicate ransomware activity. Accordingly, based on analysis the telemetry data, the analytical engine 214 may verify the security of the first device 202.

In an example, the analysis of the telemetry data includes comparing an actual parameter value that is received as part of the telemetry data with an expected parameter value. The expected parameter value may be a predefined range or value that a corresponding part of the telemetry data should meet when the security of the first device 202 is uncompromised. For instance, if the actual parameter value is significantly different than the expected parameter value, it may be determined that the security of the first device 202 is compromised. The expected parameter value may be provided, for example, by a user or may be determined by the analytical engine 214.

In an example, to verify the security of the first device 202 based on the telemetry data, in an example, the analytical engine 214 may utilize machine learning techniques, such as an Auto Regressive Integrated Moving Average (ARIMA) linear regression model, that can detect anomalies in the data received. The analytical engine 214 may monitor the parameters of the telemetry data received in the past and may forecast an expected parameter value that a corresponding part of the telemetry data should meet. The analytical engine 214 may also compare the expected parameter value with a corresponding actual parameter value received as part of the telemetry data. If the actual parameter value received in the telemetry data is considerably different than the expected parameter value (e.g., if the difference between the actual parameter value and the expected parameter value exceeds a threshold), the analytical engine 214 may determine that the security of the first device 202 is compromised. For instance, if the actual number of login attempts is significantly higher than the expected number of login attempts, the security of the first device 202 may be determined to be compromised. The analytical engine 214 may also compare the telemetry data that was received during the previous occurrence of a malware attack with the current telemetry data. If the two sets of telemetry data are similar (e.g., if the difference between the parameter values of the two sets of telemetry data is less than a threshold), the analytical engine 214 may determine that the security of the first device 202 has been compromised. In an example, the analytical engine 214 may compare the backup policy received in the telemetry data with the past telemetry data to identify a suspicious change in the backup policy, such as a reduction in the backup retention period or an increase in the frequency of backup creation.

As mentioned earlier, the telemetry data may include read count and write count of data. In an example, the system 100 may analyze the read count and the write count of the data that corresponds to the permission request 212, and may not analyze the read count and write count of the other data. For instance, since the permission request 212 corresponds to the first device data 204, the system 100 may analyze the read count and the write count of the first device data 204, and not analyze the read counts and the write counts of the other data. Thus, a wasteful analysis of the other read counts and the write counts is avoided.

Upon verifying the security of the first device 202 based on the telemetry data, the analytical engine 214 may provide the result of the analysis to the backup protection engine 213. Based on the result, the backup protection engine 213 may allow the backup-related operation to execute. For instance, if it is determined that the security of the first device 202 is uncompromised, the backup protection engine 213 may grant permission to perform the backup-related operation to the first device 202, for example, by sending a token 216 to the first device 202. If the security of the first device 202 is compromised, the backup protection engine 213 may refuse permission to perform the backup-related operation, such as by not sending the token 216 and/or by sending a refusal message (not shown in FIG. 2).

In an example, the token 216 may indicate the backup-related operation for which permission is granted and may indicate the name of the first device data 204 and/or of the backup copy 208, corresponding to which the backup-related operation is to be performed. For instance, the token 216 may indicate that permission is granted for creating a new backup copy of the first device data 204 or for deleting the backup copy 208. The details of the backup-related operation and the device data/backup copy that are to be indicated in the token 216 may be obtained from the permission request 212.

Upon receiving the token 216, the first device 202 may transmit a performance request 218 to the second device 206 for performing the backup-related operation. The performance request 218 may include details of the backup-related operation, such as a new backup copy that is to be stored in the second device 206, changes to be made to the backup copy 208, or an instruction to delete the backup copy 208. In addition to the performance request 218, the first device 202 may also transmit the token 216 to the second device 206. Based on the token 216, the second device 206 may determine that the security of the first device 202 is verified. Further, the second device 206 may verify whether the token 216 permits performance of the backup-related operation specified in the performance request 218.

The second device 206 may also verify whether the token 216 specifies the name of the device data or of the backup copy corresponding to which an operation is sought. For instance, if the performance request 218 indicates that a new backup copy of the first device data 204 is to be created, the second device 206 may check if the token 216 permits creation of a backup copy of the first device data 204. Thus, the second device 206 verifies whether the performance request 218 is consistent with the token 216. In response to a successful verification, the second device 206 performs the backup-related operation as specified in the performance request 218. The specification of the backup-related operation and the names of the backup copy and/or the device data in the token 216, and the verification of the token 216 by the second device 206 ensures that the backup-related operation performed is same as the one for which the permission was granted by the system 100.

In an example, instead of or in addition to verifying the consistency between the performance request 218 and the token 216, the second device 206 may determine whether the token 216 is authentic. To perform the determination, the second device 206 may send an authentication request to the system 100, requesting the system 100 to verify whether the token 216 was issued by the system 100 and whether the token 216 is valid. Upon receiving the request, the system 100 may verify the authenticity and validity of the token 216. For instance, the system 100 may verify that the token 216 was indeed issued by the system 100 and that the token 216 was issued in response to a recent permission request. In response to successful authentication of the token 216, the system 100 may send a message to the second device 206 indicating that the token 216 is authentic. Performing the backup-related operation after authentication of the token 216 prevents a scenario in which the backup-related operation is performed based on a fake token created by a malware.

If the security of the first device 202 is compromised, the backup protection engine 213 may refuse permission to perform the backup-related operation, such as by not sending the token 216 and/or by sending a refusal message (not shown in FIG. 2). Accordingly, the first device 202 does not send the performance request 218 to the second device 206. Even if the first device 202 sends the performance request 218 to the second device 206, the second device 206 refuses to perform the backup-related operation, as the token 216 is not sent to the second device 206. In another example, upon verification of security of the first device 202, the system 100 may send the token 216 to the second device 206, instead of the first device 202. Based on the token 216, the second device 206 may carry out the backup-related operation as indicated by the performance request 218.

The grant or refusal of permission to perform the backup-related operation may be thus performed without having to analyze the contents of the backup copy 208 or the first device data 204. For instance, the system 100 does not have to compare a backup copy that is to be newly created against the backup copy 208. Similarly, the system 100 does not have to process the proposed changes to be made to the backup copy 208 or analyze the actions carried out on the first device data 204. Instead, as explained above, the granting and refusal of permission may be performed based on an analysis of the telemetry data received from the first device 202. This can help to improve privacy of user data that is part of the first device data 204 and the backup copy 208. Also, since the first device data 204 and the backup copy 208 are not to be transmitted to the system 100 and since the size of the telemetry data is small (e.g., in the range of kilobytes), the amount of data to be transmitted to the system 100 is minimal.

In an example, the system 100 may periodically receive the telemetry data from the first device 202. For instance, a set of telemetry data may be received by the system 100 after expiration of a particular time interval. Further, the set of telemetry data may indicate, for example, the operations performed on the first device 202 in that time interval, the workload information of the hardware components of the first device 202 in that time interval, the backup policy that was in force in that time interval, or any combination of the foregoing. For example, a zeroth set of telemetry data 220 may indicate the operations performed, workload of the hardware components, or backup policy in force in a time interval between T=0 and T=1 minute, a first set of telemetry data 222 may indicate the operations performed, workload of the hardware components, or backup policy in force in a time interval between T=minute 1 and T=minute 2, and so on. The sets of telemetry data received may be stored in a data store 224. The data store 224 may be, for example, a data lake.

In an example, to verify the security of the first device 202, the analytical engine 214 may utilize the sets of telemetry data that are in temporal proximity of the time of receipt of the permission request 212. For instance, the analytical engine 214 may analyze the sets of telemetry data that were received in a first time period before the receipt of the permission request 212. The sets of telemetry data received in the first time period before the receipt of the permission request 212 may be referred to as eligible past telemetry data. Consider that the first time period is 5 minutes long and that the permission request 212 was received at $t^{th}$ minute from a reference point of time. Accordingly, the analytical engine 214 may analyze the sets of telemetry data received between $t^{th}$ minute and 5 minutes prior to the $t^{th}$ minute. Thus, if the zeroth set of telemetry data 220 was received between $t^{th}$ minute and 5 minutes prior to the $t^{th}$ minute, the zeroth set of telemetry data 220 is part of eligible past telemetry data, and is analyzed by the analytical engine 214.

Instead of, or in addition to, analyzing the eligible past telemetry data, the analytical engine 214 may analyze the sets of telemetry data that are received in a second time period after the receipt of the permission request 212. The sets of telemetry data received in the second time period after the receipt of the permission request 212 may be referred to as eligible future telemetry data. Consider that the second time period is 5 minutes long and that the permission request 212 was received at $t^{th}$ minute from a reference point of time. Accordingly, the analytical engine 214 may analyze the sets of telemetry data received between $t^{th}$ minute and 5 minutes after the $t^{th}$ minute. Thus, if the first set of telemetry data 222 is received between the $t^{th}$ minute and 5 minutes after the $t^{th}$ minute, the first set of telemetry data 222 is part of eligible future telemetry data, and is analyzed by the analytical engine 214. Further, if a second set of telemetry data 226 is received 5 minutes after the $t^{th}$ minute, the second set of telemetry data 226 is not analyzed by the analytical engine 214. The analysis of the telemetry data in temporal proximity of the permission request 212 ensures that relevant data is considered for verifying the security of the first device 202.

In an example, the analysis of the telemetry data may include comparing the telemetry data in temporal proximity of the permission request 212 with the remainder of the telemetry data received from the first device 202 and stored in the data store 224. Based on the comparison, if it is determined that there are significant deviations between the telemetry data in temporal proximity of the permission request 212 and the remainder of the telemetry data, the system 100 may determine that the security of the first device 202 is compromised.

In an example, the length of the second time period may be equal to that of the first time period. Also, in an example, the lengths of the first time period and the second time period may each be a multiple of a length of the time interval at which the sets of telemetry data are received from the first device 202. For instance, the sets of telemetry data may be received once in one minute, and the first and the second time periods may each have a length of five minutes.

In an example, the system 100 may receive a heartbeat message periodically from the first device 202. The heartbeat message may indicate that the first device 202 is functional, and may be sent at a higher frequency than the telemetry data. Further, the system 100 may initiate the analysis of the sets of telemetry data as explained above if a heartbeat message is received after the permission request 212. Thus, the permission request 212 is processed after ensuring that the first device 202 is functional. Therefore, the present subject matter prevents wasteful expenditure of resources for processing a request corresponding to a non-functional device.

The telemetry data may be received from the first device 202 regardless of whether a backup-related request is received. In an example, the system 100 may be a system that periodically receives and analyzes at least some parts of the aforesaid telemetry data to identify or predict faults in the operation of the first device 202. For example, the system

100 may perform analytical operations on some parts of the telemetry data, such as workload information of the hardware components, and predict an impending failure of a component of the first device 202. Since the first device 202 already transmits at least some parts of the aforesaid telemetry data to the system 100 for identification and prediction of faults, the present subject matter ensures that little to no additional data is to be transmitted by the first device 202 to verify the security of the first device 202 and to process backup-related requests corresponding to the first device 202. Therefore, the techniques of the present subject matter can be implemented with minimal overhead to the first device 202.

Although the system 100 is described as periodically receiving the telemetry data, in an example, another device (not shown in FIG. 2) connected to the system 100 may receive the telemetry data. Further, the system 100 may fetch the past telemetry data and/or the future telemetry data to be analyzed from the other device in response to receiving a backup-related request.

Although not shown, the various components of the network environment 200 may communicate with each other over a communication network, which may be a wireless or a wired network, or a combination thereof. The communication network may be a collection of individual networks, interconnected with each other and functioning as a single large network (e.g., the internet or an intranet). Examples of such individual networks include Global System for Mobile Communication (GSM) network, Universal Mobile Telecommunications System (UMTS) network, Personal Communications Service (PCS) network, Time Division Multiple Access (TDMA) network, Code Division Multiple Access (CDMA) network, Next Generation Network (NGN), Public Switched Telephone Network (PSTN), and Integrated Services Digital Network (ISDN). Depending on the technology, the communication network may include various network entities, such as transceivers, gateways, and routers.

Figure 3:
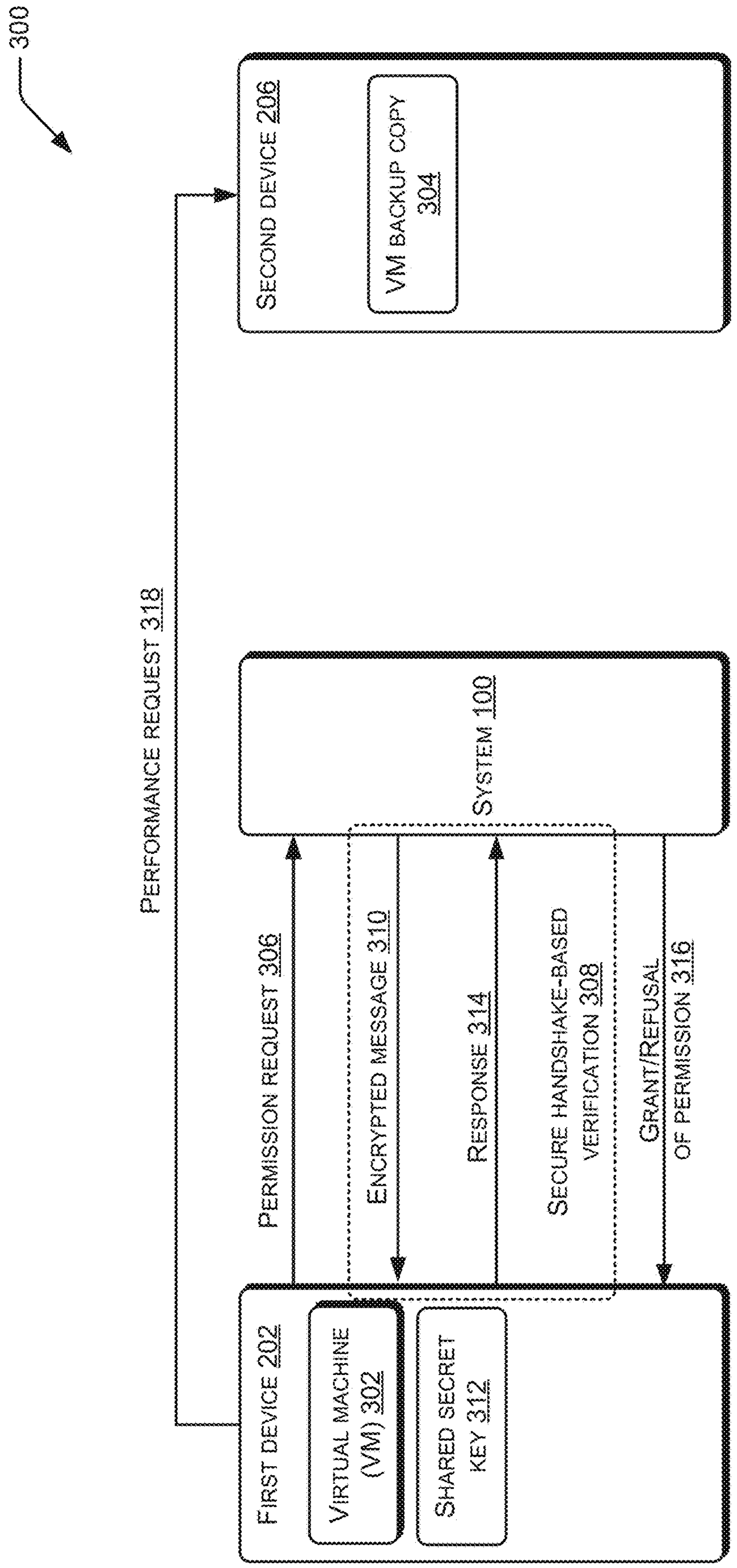
FIG. 3 illustrates a network environment implementing verification of security of a first device for permitting performance of backup-related operations, according to an example implementation of the present subject matter.

FIG. 3 illustrates the network environment 300 implementing verification of security of the first device 202 for permitting performance of backup-related operations, according to an example implementation of the present subject matter. The network environment 300 may correspond to the network environment 200.

The first device data 204 (not shown in FIG. 3) may relate to a VM 302 hosted in the first device 202. Further, the second device 206 may include a backup copy 304 corresponding to the VM 302. The backup copy 304 corresponding to the VM 302 may be referred to as a VM backup copy. In the below explanation, the present subject matter is explained with reference to an example in which a backup copy stored in the second device 206 is a VM backup copy.

The system 100 may receive a permission request 306 to perform a VM backup-related operation, such as modification or deletion of the VM backup copy 304 or creation of a new VM backup copy. As explained above, in response to receiving the request, the system 100 may analyze the telemetry data of the first device 202 to verify the security of the first device 202. If the security of the first device 202 is determined to be uncompromised based on its telemetry data, in an example, the system 100 may verify the security of the first device 202 by establishing a secure handshake with the first device 202.

A secure handshake-based verification 308 involves the system 100 transmitting a message 310 to the first device 202. The message 310 is encrypted with a shared secret key 312 that is known to the first device 202 and the system 100. The shared secret key 312 may be stored in a storage or a memory (not shown in FIG. 3) of the first device 202. If the first device 202 is not infected by ransomware, i.e., if the security of the first device 202 is uncompromised, the shared secret key 312 may be stored in the first device 202 in an unencrypted state. Therefore, the shared secret key 312 is accessible to the first device 202 and is used by the first device 202 to decrypt the message 310. Upon decryption, the first device 202 may send a response 314 to the message 310. In an example, the response 314 may be sent as part of a heartbeat message. The receipt of the response 314 establishes a secure handshake between the first device 202 and the system 100. If the security of the first device 202 is compromised, the shared secret key 312 may be stored in an encrypted state on the first device 202, as the malware may have encrypted data stored on the first device, and may be inaccessible to the first device 202. Therefore, the first device 202 may not send the response 314 to the system 100. Thus, the secure handshake is not established, and the system 100 determines that the security of the first device 202 is compromised. In an example, the system 100 determines that the security of the first device 202 is compromised in response to non-receipt of the response 314 within a predetermined period of transmission of the message 310.

The system 100 may grant permission to perform the backup-related operation upon establishment of the secure handshake and may refuse permission in response to non-establishment of the secure handshake. The grant or refusal of the permission may be sent to the first device 202, as indicated by the arrow 316, or the second device 206. The grant of permission may be indicated by transmitting a token, as explained earlier. Upon grant of permission, the first device 202 may send a performance request 318 to the second device 206. The performance request 318 may include a new VM backup copy, proposed changes to the VM backup copy 304, or an instruction to delete the VM backup copy 304. Thus, the secure handshake-based verification 308 acts as a second stage of verification of security of the first device 202. Thus, the accuracy in verification of security is increased, thereby preventing non-usability of the backup copies.

Figure 4:
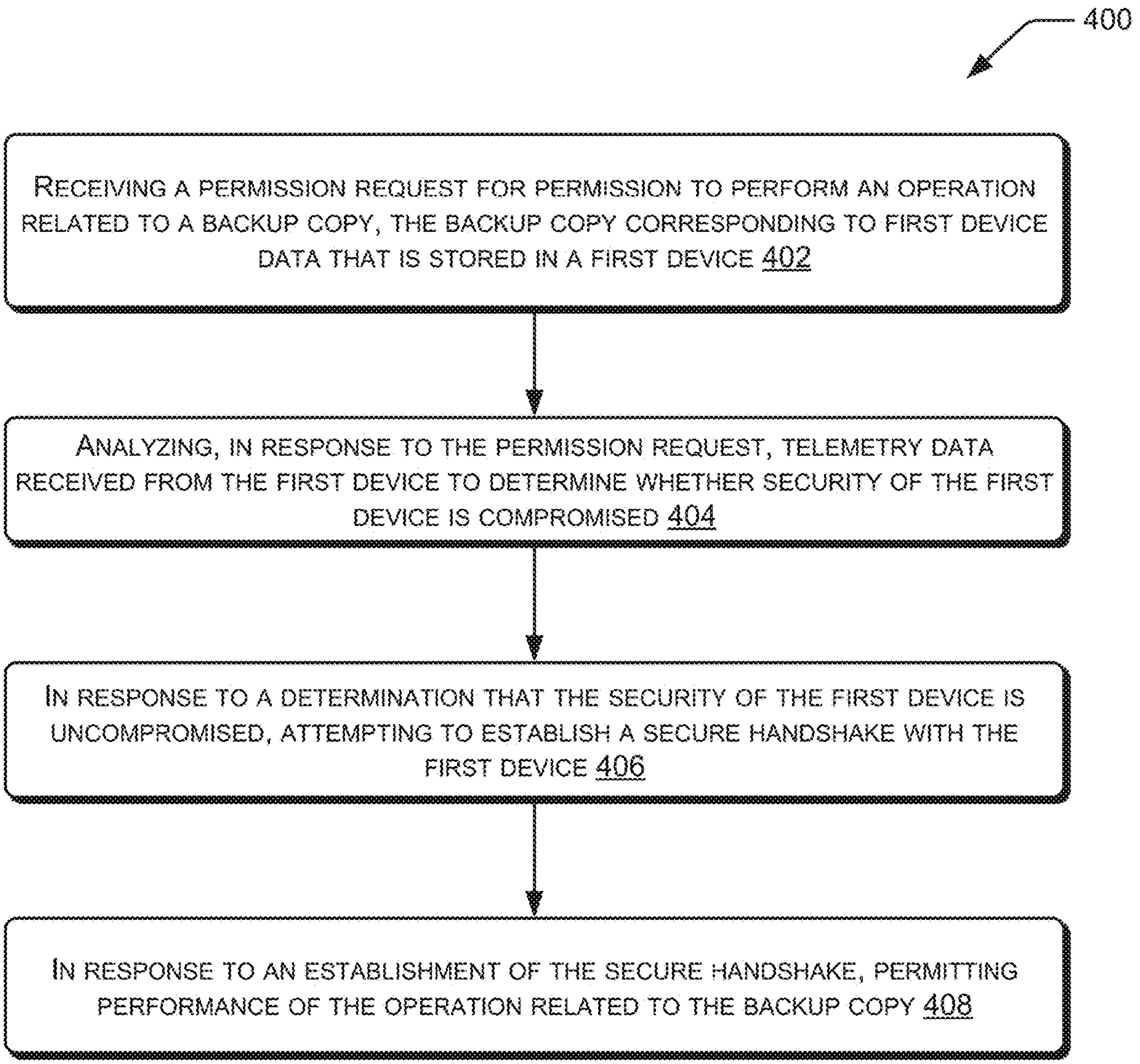
FIG. 4 illustrates a method for permitting performance of backup-related operations, according to an example implementation of the present subject matter.
Figure 5:
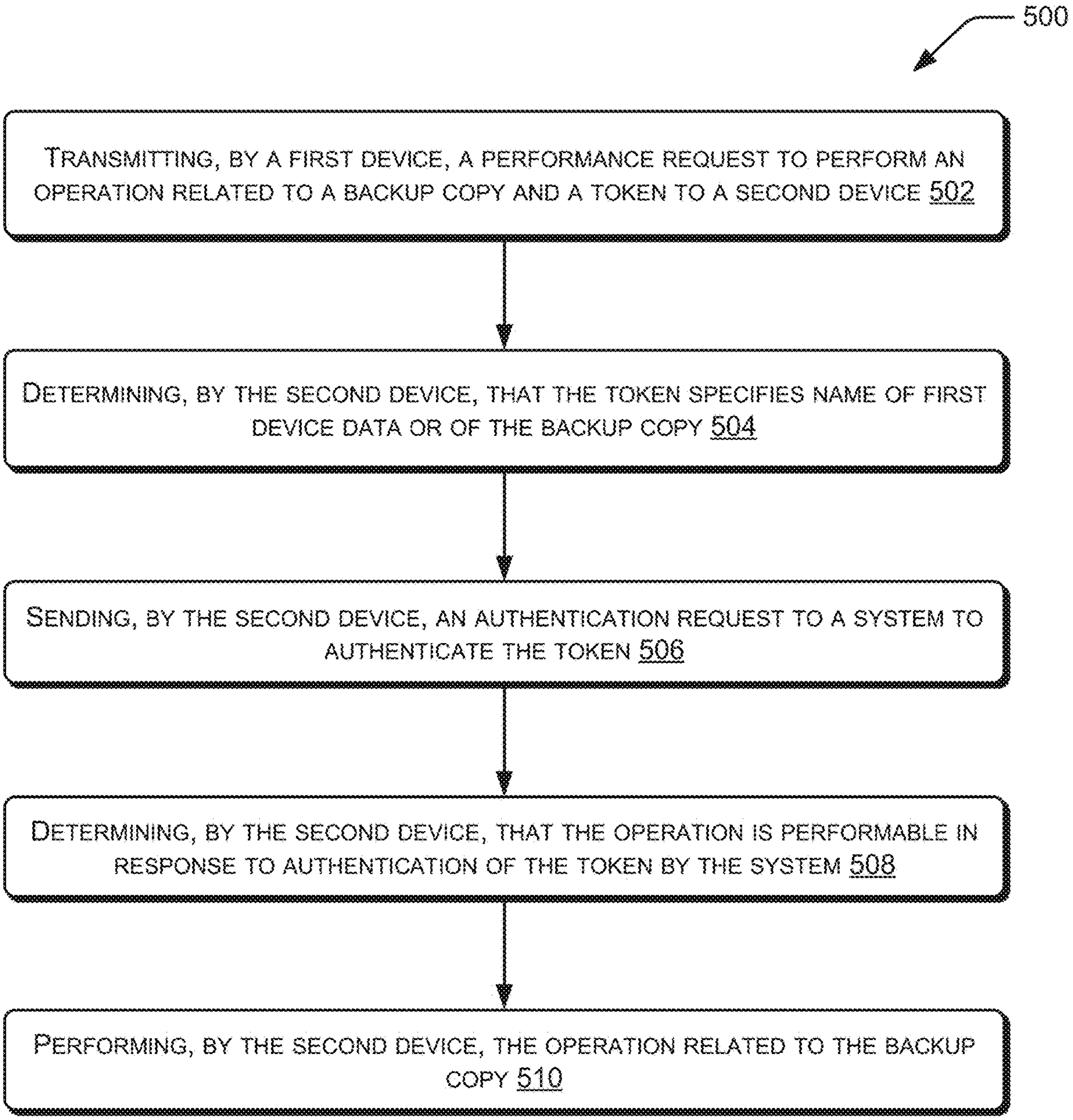
FIG. 5 illustrates a method for performance of backup-related operations, according to an example implementation of the present subject matter.

FIGS. 4 and 5 illustrate methods 400 and 500, respectively, for permitting performance of backup-related operations, according to example implementations of the present subject matter. The orders in which the methods 400 and 500 are described is not intended to be construed as a limitation, and any number of the described method blocks may be combined in any order to implement the method 400, or alternative methods. Furthermore, the methods 400 and 500 may be implemented by processing resource(s) or computing device(s) through any suitable hardware, non-transitory machine-readable instructions, or a combination thereof.

It may be understood that blocks of the methods 400 and 500 may be performed by programmed computing devices and may be executed based on instructions stored in a non-transitory computer readable medium. The non-transitory computer readable medium may include, for example, digital memories, magnetic storage media, such as magnetic disks and magnetic tapes, hard drives, or optically readable digital data storage media. Although the method 400 may be implemented in a variety of systems, the method 400 is described in relation to the system 100, for ease of explanation. In an example, the method 400 may be performed by a system, such as the system 100.

Referring to FIG. 4, at block 402, a permission request for permission to perform an operation related to a backup copy is received. The backup copy corresponds to first device data that is stored in the first device. The backup copy may be stored or may have to be stored in a second device. In an example, permission request may be a request to modify or delete a backup copy that is stored in the second device. In another example, the permission request may be a request to create a new backup copy in the second device.

The permission request may be received, for example, from the first device or the second device and may be, for example, the permission request 212 or the permission request 306. The first device may be the first device 202, the second device may be the second device 206, the first device data may be the first device data 204, and the backup copy may be the backup copy 208. In an example, the first device data pertains to a VM, such as the VM 302, which is hosted in the first device. Further, the backup copy includes an image from which a VM can be restored, such as the VM backup copy 304. In another example, the first device data pertains to the first device and the backup copy includes an image from which the first device can be restored to its operational state.

In response to the permission request, at block 404, telemetry data received from the first device is analyzed to determine whether security of the first device is compromised. The telemetry data may indicate the operations performed in the first device, the workload information of hardware components of the first device, a backup policy, or other data as explained with reference to FIGS. 1 and 2. In an example, the telemetry data is devoid of contents of the backup copy or contents of the first device data. For instance, if the operation related to the backup copy is a backup copy modification operation, the telemetry data may not indicate the changes made to the first device data. Further, if the operation related to the backup copy is a backup creation operation, the telemetry data may not include the new backup copy. Similarly, if the operation related to the backup copy is a backup deletion operation, the telemetry data may not include the backup copy to be deleted.

In an example, the telemetry data analyzed includes telemetry data received for a first time period before receiving the permission request or the telemetry data received for a second time period after receiving the permission request or both, as explained with reference to FIG. 2. In an example, the telemetry data may be periodically received from the first device. Further, a length of each of the first time period and the second time period may be a multiple of a length of an interval at which the telemetry data is periodically received from the first device. For instance, the length of the interval may be 1 minute, and the first time period and the second time period may each be five minutes, as explained above.

In response to a determination that the security of the first device is uncompromised, at block 406, an attempt is made to establish a secure handshake with the first device. The attempt may include transmitting a message encrypted with a secret key, such as the shared secret key 312, that is known to the first device. If a response is received for the message from the first device, it may be determined that the secure handshake is established, as explained with reference to FIG. 3.

In response to an establishment of the secure handshake, at block 408, the performance of the operation related to the backup copy is permitted. In an example, permitting performance of the operation includes transmitting a token, such as the token 216, to the first device.

FIG. 5 illustrates a method 500 for performance of backup-related operations, according to an example implementation of the present subject matter. The method 500 may be performed, for example, by the first device 202 and the second device 206. Further, the method 500 may be performed upon receipt of the token from the system by the first device.

In an example, the permission request specifies the name of the first device data or of the backup copy. Further, the token may specify the name of the first device data or of the backup copy, whichever was specified in the permission request. Upon receiving the token, at block 502, the first device transmits a performance request, such as the performance request 218 or the performance request 318, to perform the backup-related operation and the token to the second device. At block 504, the second device may then determine that the token specifies the name of the first device data or of the backup copy. Subsequently, the second device may perform the operation related to the backup copy.

In an example, prior to performing the backup-related operation, at block 506, the second device may send an authentication request to the system to authenticate the token. In response to authentication of the token by the system, at block 508, the second device determines that the operation can be performed, as explained with reference to FIG. 2. Subsequently, at block 510, the second device may perform the operation related to the backup copy.

Figure 6:
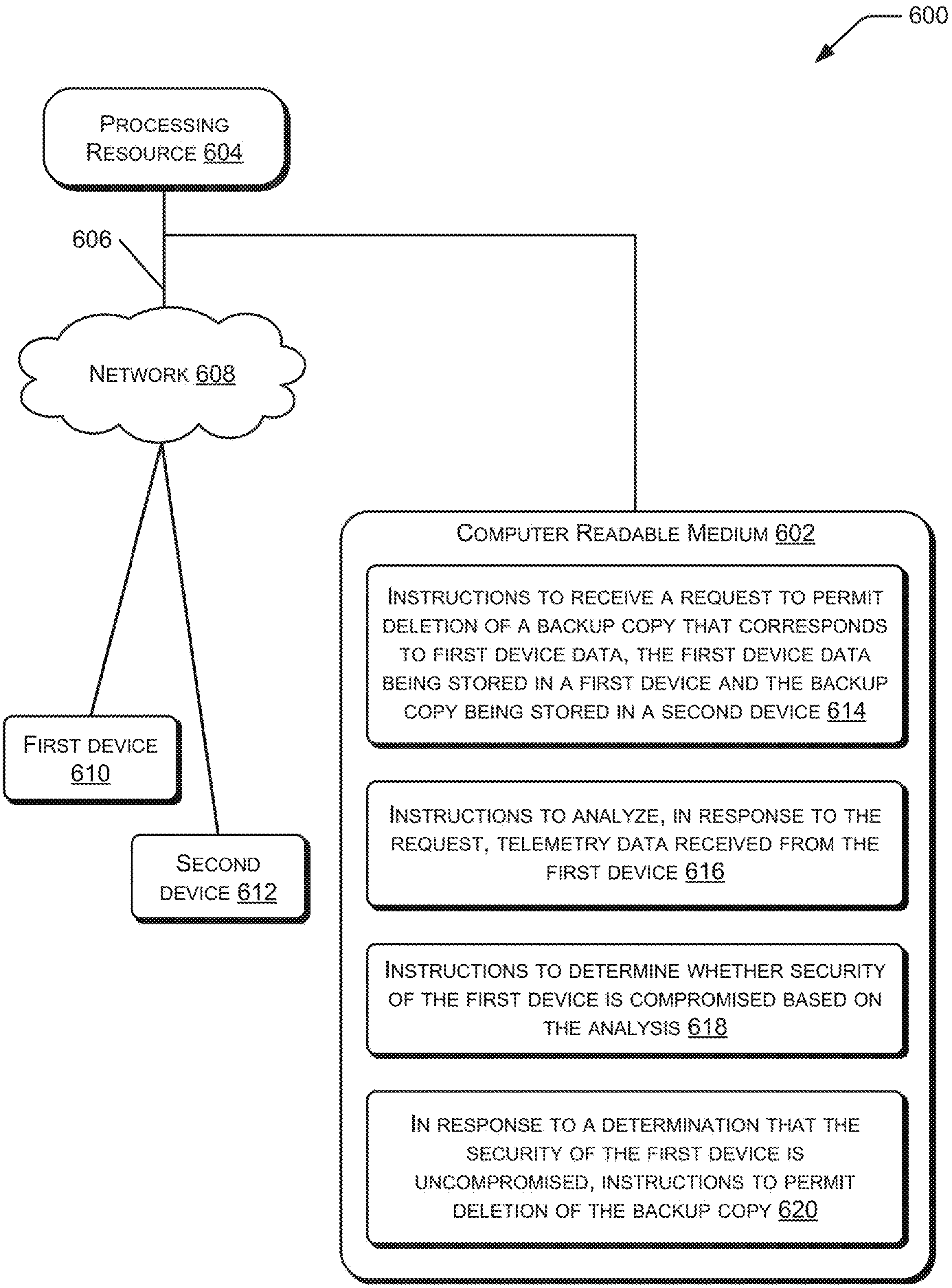
FIG. 6 illustrates a computing environment implementing a non-transitory computer-readable medium for permitting performance of backup-related operations, according to an example implementation of the present subject matter.

FIG. 6 illustrates a computing environment 600 implementing a non-transitory computer-readable medium for permitting performance of backup-related operations, according to an example implementation of the present subject matter. In an example, the non-transitory computer-readable medium 602 may be utilized by a system, such as the system 100. In an example, the computing environment 600 may include a processing resource 604 communicatively coupled to the non-transitory computer-readable medium 602 through a communication link 606. The processing resource 604 may be, for example, the processor 102.

The non-transitory computer-readable medium 602 may be, for example, an internal memory device or an external memory device. In an example, the communication link 606 may be a direct communication link, such as any memory read/write interface. In another example, the communication link 606 may be an indirect communication link, such as a network interface. In such a case, the processing resource 604 may access the non-transitory computer-readable medium 602 through a network 608. The network 608 may be a single network or a combination of multiple networks and may use a variety of different communication protocols.

The processing resource 604 and the non-transitory computer-readable medium 602 may also be communicatively coupled to a first device 610, which may be a computing device that stores first device data (not shown in FIG. 6), and a second device 612, that stores a backup copy (not shown in FIG. 6) corresponding to the first device data. The first device 610 and the second device 612 may be the first device 202 and the second device 206 respectively. Further, the first device data and the backup copy may be the first device data 204 and the backup copy 208 respectively.

In an example implementation, the non-transitory computer-readable medium 602 includes a set of computer-readable instructions for permitting performance of backup-related operations. The set of computer-readable instructions can be accessed by the processing resource 604 through the communication link 606 and subsequently executed.

Referring to FIG. 6, in an example, the non-transitory computer-readable medium 602 includes instructions 614 that cause the processing resource 604 to receive a request to permit deletion of the backup copy that corresponds to the first device data. The request may be, for example, the permission request 212 or the permission request 306. As mentioned earlier, the first device data is stored in the first device and the backup copy is stored in the second device.

The non-transitory computer-readable medium 602 includes instructions 616 that cause the processing resource 604 to analyze, in response to the request, telemetry data received from the first device. In an example, telemetry data analyzed may be the telemetry data received within a first time period before a time of receipt of the request and telemetry data received within a second time period after a time of receipt of the request, as explained with reference to FIG. 2.

The non-transitory computer-readable medium 602 includes instructions 618 that cause determining whether security of the first device is compromised based on the analysis. In response to a determination that the security of the first device is uncompromised, instructions 620 cause permitting deletion of the backup copy. The deletion may be permitted, for example, by sending a token, such as the token 216, to the first device that indicates the granting of the permission to delete the backup copy.

In an example, in response to a determination that security of the first device is uncompromised based on the analysis of the telemetry data, the instructions are executable by to transmit a message encrypted with a secret key, such as the shared secret key 312, that is known to the first device. Further, the deletion is permitted in response to receipt of a response for the message from the first device, as explained with reference to FIG. 3.

In an example, in addition to granting and refusing permissions for carrying out deletions of backup copies, the instructions also allow granting and refusing permissions for carrying out modifications of backup copies. For instance, the instructions cause receiving a request to modify a second backup copy that corresponds to the first device data. The second backup copy may be, for example, a backup copy of the first device data created after deletion of the backup copy. In response to a determination that the security of the first device is uncompromised, the instructions may grant permission to modify the second backup copy. Similarly, in an example, the instructions may also allow granting and refusing permissions for carrying out creation of backup copies.

The present subject matter may prevent loss and non-usability of a backup copy due to malware attacks on a computing device storing parent data. The present subject matter utilizes telemetry data of a computing device sending a request for the backup-related operation to determine whether security of the computing device is compromised. Therefore, the details of the backup-related operation, such as the changes to be made to the backup copy or the new backup copy, may not have to be analyzed. Thus, the present subject matter may provide a simpler and a more efficient determination regarding the security of the computing device. Further, the present subject matter may leverage the telemetry data that is already received from the computing device for identification and prediction of faults. Thus, additional data may not have to be received from the computing device to implement the present subject matter.

The usage of a data immutability feature in a backup device, which prevents alterations to backup copies, to prevent loss or non-usability of the backup copies may be avoided by implementing teachings of the present subject matter as it verifies security of the computing device before permitting alterations to the backup copies. Therefore, genuine backup-related operations, such as the backup-related operations initiated by a storage administrator, can be performed.

Although implementations of permissions for backup-related operations have been described in language specific to structural features and/or methods, it is to be understood that the present subject matter is not necessarily limited to the specific features or methods described. Rather, the specific features and methods are disclosed and explained as example implementations.

We claim:

1. A system comprising:

a processor; and a non-transitory storage medium comprising instructions executable on the processor to:

receive, at the system from a first device over a network, a permission request to permit an operation related to a backup copy, the backup copy corresponding to first device data that is stored in the first device, and the backup copy to be stored in a second device that is separate from the first device;

analyze, in response to the permission request, telemetry data received from the first device within a first time period relative to a time of receipt of the permission request, wherein the telemetry data comprises one or more of a number of login attempts, a number of file encryptions, a number of file modifications, a number of file deletions, workload information of hardware components of the first device, a backup policy, a read count of the first device data, or a write count of the first device data;

determine whether security of the first device is compromised based on the analysis;

based on a determination that the security of the first device is uncompromised, permit the operation related to the backup copy by sending a token from the system to the first device over the network;

receive, at the system from the second device, the token that was sent from the first device to the second device as part of a performance request from the first device to perform the operation related to the backup copy, wherein the token from the second device is sent from the second device to the system based on a determination at the second device that the performance request from the first device is consistent with the token;

validate, at the system, the token received from the second device; and based on validating the token, send, from the system, a response indicating that the token is authentic to permit performance by the second device of the operation related to the backup copy.

2. The system of claim 1, wherein, to analyze the telemetry data received from the first device, the instructions are executable on the processor to compare an actual parameter value that is part of the telemetry data with an expected parameter value corresponding to an uncompromised security state of the first device.

3. The system of claim 1, wherein the instructions are executable on the processor to:

identify the time of receipt of the permission request;

determine the first time period that is before or after the time of receipt of the permission request; and as part of the analysis, compare the telemetry data received from the first device within the first time period with a remainder of the telemetry data received from the first device.

4. The system of claim 1, wherein the operation related to the backup copy is a backup creation operation, a backup modification operation, or a backup delete operation.

5. The system of claim 1, wherein the token specifies the operation related to the backup copy that is permitted.

6. The system of claim 5, wherein the token is received from the second device based on a determination at the second device that the operation specified by the performance request is consistent with the operation related to the backup copy specified by the token.

7. A method comprising:

receiving, by a system comprising a hardware processor, a permission request from a first device over a network for permission to perform an operation related to a backup copy, the backup copy corresponding to first device data that is stored in the first device, and the backup copy to be stored in a second device that is separate from the first device;

analyzing, by the system in response to the permission request, telemetry data received from the first device within a first time period relative to a time of receipt of the permission request, wherein the telemetry data comprises one or more of a number of login attempts, a number of file encryptions, a number of file modifications, a number of file deletions, workload information of hardware components of the first device, a backup policy, a read count of the first device data, or a write count of the first device data;

determining, by the system, whether security of the first device is compromised based on the analysis;

based on a determination that the security of the first device is uncompromised, permitting the operation related to the backup copy by sending a token from the system to the first device over the network;

receiving, at the system from the second device, the token that was sent from the first device to the second device as part of a performance request from the first device to perform the operation related to the backup copy, wherein the token from the second device is sent from the second device to the system based on a determination at the second device that the performance request from the first device is consistent with the token;

validating, by the system, the token received from the second device; and based on validating the token, sending, from the system, a response to the second device indicating that the token is authentic to permit performance by the second device of the operation related to the backup copy.

8. The method of claim 7, wherein the telemetry data comprises telemetry data received in the first time period before receiving the permission request, and telemetry data received in a second time period after receiving the permission request.

9. The method of claim 7, comprising:

based on the determination that the security of the first device is uncompromised, attempting, by the system, to establish a secure handshake with the first device, wherein the permitting of the operation related to the backup copy by the system is further based on an establishment of the secure handshake.

10. The method of claim 9, wherein the attempting to establish the secure handshake comprises transmitting a message encrypted with a secret key that is known to the first device, the method comprising:

determining that the secure handshake is established in response to receiving, from the first device, a response for the message.

11. The method of claim 7, wherein the token specifies the operation related to the backup copy that is permitted.

12. The method of claim 11, wherein the token is received from the second device based on a determination at the second device that the operation specified by the performance request is consistent with the operation related to the backup copy specified by the token.

13. The method of claim 7, wherein the first device data pertains to a virtual machine (VM) hosted in the first device, and the backup copy comprises an image from which the VM can be restored.

14. A non-transitory computer-readable medium comprising instructions, the instructions being executable by a system to:

receive, at the system from a first device over a network, a permission request to permit an operation related to a backup copy, the backup copy corresponding to first device data that is stored in the first device, and the backup copy to be stored in a second device that is separate from the first device;

analyze, in response to the permission request, telemetry data received from the first device within a first time period relative to a time of receipt of the permission request, wherein the telemetry data comprises one or more of a number of login attempts, a number of file encryptions, a number of file modifications, a number of file deletions workload information of hardware components of the first device, a backup policy, a read count of the first device data, or a write count of the first device data;

determine whether security of the first device is compromised based on the analysis;

based on a determination that the security of the first device is uncompromised, permit the operation related to the backup copy by sending a token from the system to the first device;

receive, at the system from the second device, the token that was sent from the first device to the second device as part of a performance request from the first device to perform the operation related to the backup copy, wherein the token from the second device is sent from the second device to the system based on a determination at the second device that the operation specified by the performance request is consistent with the token;

validate, at the system, the token received from the second device; and based on validating the token, send, from the system, a response indicating that the token is authentic to permit performance by the second device of the operation related to the backup copy.

15. The non-transitory computer-readable medium of claim 14, wherein the response sent from the system comprises a message sent from the system to the second device.

* * * * *